United States Patent
Yan et al.

(10) Patent No.: US 10,284,272 B2
(45) Date of Patent: May 7, 2019

(54) CHANNEL ESTIMATION APPARATUS AND METHOD

(71) Applicant: HUAWEI TECHNOLOGIES CO., LTD., Shenzhen, Guangdong (CN)

(72) Inventors: Min Yan, Shenzhen (CN); Junping Zhang, Shenzhen (CN); Wei Wang, Hong Kong (HK); Qian Zhang, Hong Kong (HK)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 193 days.

(21) Appl. No.: 15/258,943

(22) Filed: Sep. 7, 2016

(65) Prior Publication Data

US 2016/0380688 A1     Dec. 29, 2016

Related U.S. Application Data

(63) Continuation of application No. PCT/CN2014/075039, filed on Apr. 10, 2014.

(51) Int. Cl.
*H04B 7/026*     (2017.01)
*H04B 7/06*     (2006.01)
(Continued)

(52) U.S. Cl.
CPC ....... *H04B 7/0626* (2013.01); *H04L 25/0202* (2013.01); *H04L 43/16* (2013.01);
(Continued)

(58) Field of Classification Search
None
See application file for complete search history.

(56) References Cited

U.S. PATENT DOCUMENTS 6,414,988 B1   7/2002 Ling
8,462,872 B2   6/2013 Zhu et al.
(Continued)

FOREIGN PATENT DOCUMENTS

CN   102291351       12/2011
CN   102291351 A     12/2011
(Continued)

OTHER PUBLICATIONS

International Search Report dated Jan. 19, 2015 for PCT/CN2014/075039.

*Primary Examiner* — Jamaal R Henson
(74) *Attorney, Agent, or Firm* — Womble Bond Dickinson (US) LLP (57) ABSTRACT

A channel estimation apparatus and method are provided to ensure that a channel estimation value can correctly reflect a transmission channel status, so that an orthogonal frequency division multiplexing (OFDM)-based wireless system can correctly transmit an aggregate long frame according to the channel estimation value. The channel estimation apparatus determines a first channel estimation value, receives a first symbol group of a long frame according to the first channel estimation value, and determines a second channel estimation value according to the first symbol group, and if a difference between the first channel estimation value and the second channel estimation value is less than or equal to a first threshold, determines a third channel estimation value according to the first channel estimation value and the second channel estimation value.

18 Claims, 3 Drawing Sheets

(51) Int. Cl.
     *H04L 12/26*      (2006.01)
     *H04L 29/06*      (2006.01)
     *H04L 25/02*      (2006.01)
     *H04L 27/26*      (2006.01)

(52) U.S. Cl.
    CPC .......... *H04L 69/22* (2013.01); *H04L 27/2601* (2013.01); *H04L 27/2602* (2013.01)

(56) References Cited

U.S. PATENT DOCUMENTS

| | | | |
|---|---|---|---|
| 8,537,908 B2 | 9/2013 | Gore et al. | |
| 8,976,908 B1 * | 3/2015 | Nabar | H04L 25/0236 375/316 |
| 2005/0185738 A1 * | 8/2005 | Gaikwad | H04L 25/023 375/340 |
| 2008/0045153 A1 * | 2/2008 | Surineni | H04B 7/0417 455/63.1 |
| 2013/0343211 A1 * | 12/2013 | Liu | H04L 25/0204 370/252 |

FOREIGN PATENT DOCUMENTS

| | | |
|---|---|---|
| CN | 103220242 | 7/2013 |
| CN | 103220242 A | 7/2013 |
| CN | 103401825 | 11/2013 |
| CN | 103401825 A | 11/2013 |
| EP | 2312801 A2 | 4/2011 |
| WO | 2015154274 A1 | 10/2015 |

* cited by examiner

CHANNEL ESTIMATION APPARATUS AND METHOD

CROSS REFERENCE TO RELATED APPLICATIONS

This application is a continuation of International Patent Application No. PCT/CN2014/075039, filed on Apr. 10, 2014, which is hereby incorporated by reference in its entirety.

TECHNICAL FIELD

This disclosure relates to the communications field, and in particular, to a channel estimation apparatus and method.

BACKGROUND

To meet increasing demands for data traffic, in a current Wi-Fi (wireless fidelity) standard, wider channels and advanced physical layer technologies are used, for example, OFDM (orthogonal frequency division multiplexing) technology and MIMO (multiple-input multiple-output) technology are used to increase a data transmission rate at a physical layer. With development of technologies, a data rate at the physical layer becomes increasingly high. However, the increased data rate at the physical layer decreases data-occupied time, resulting in significantly decreased data throughput efficiency.

To resolve the decreased data throughput efficiency, in the prior art, multiple conventional frames are generally aggregated into one long frame before being sent. A transmit end in an OFDM-based wireless system aggregates frames to be sent to different receive ends into one long frame at the transmit end for transmission, and adds a preamble corresponding to each subframe into a preamble or frame at a physical layer, so that the different receive ends can correctly receive corresponding subframes.

However, in the prior art, after a receive end obtains channel estimation according to a data packet header of a frame, because a longer frame takes longer frame receiving time and a transmission channel varies with time, when a long frame is received, the channel estimation obtained according to the data packet header cannot accurately reflect a transmission channel status due to longer time, resulting in an error in data transmission.

SUMMARY

Embodiments described herein provide a channel estimation apparatus and method, to ensure that a channel estimation value can correctly reflect a transmission channel status, so that an OFDM-based wireless system can correctly transmit an aggregate long frame according to the channel estimation value.

To achieve the foregoing objective, the following technical solutions are used in the embodiments described herein:

According to a first aspect, a channel estimation apparatus is provided, including:

a processing unit, configured to determine a first channel estimation value; and an obtaining unit, configured to receive a first symbol group of a long frame according to the first channel estimation value obtained by the processing unit, where the long frame includes at least two symbol groups, and the symbol group includes at least one data symbol, where the processing unit is further configured to: determine a second channel estimation value according to the first symbol group obtained by the obtaining unit, and if a difference between the first channel estimation value and the second channel estimation value is less than or equal to a first threshold, determine a third channel estimation value according to the first channel estimation value and the second channel estimation value.

With reference to the first aspect, in a first possible implementation manner of the first aspect, the obtaining unit is further configured to obtain a data packet header of the long frame before the first channel estimation value is determined; and the processing unit is specifically configured to determine the first channel estimation value according to the data packet header obtained by the obtaining unit.

With reference to the first aspect, in a second possible implementation manner of the first aspect, the processing unit is specifically configured to determine the third channel estimation value according to a first formula, where the first formula is H3=a*H1+(1−a)*H2, where H1 is the first channel estimation value, H2 is the second channel estimation value, H3 is the third channel estimation value, and a is a weight of the first channel estimation.

With reference to the second possible implementation manner of the first aspect, in a third possible implementation manner of the first aspect, the processing unit is further configured to determine the weight according to a second formula before determining the third channel estimation value according to the first formula, where the second formula is a=(s+1)/(s+2), where s is a data symbol sequence number, in the long frame, of the last data symbol in the first symbol group.

With reference to the first aspect, in a fourth possible implementation manner of the first aspect, the obtaining unit is further configured to obtain a check code corresponding to the first symbol group; and the processing unit is further configured to check the first symbol group according to the check code obtained by the obtaining unit.

With reference to the fourth possible implementation manner of the first aspect, in a fifth possible implementation manner of the first aspect, the obtaining unit is specifically configured to obtain, by using a phase shift, the check code corresponding to the first symbol group.

According to a second aspect, a channel estimation method is provided, including:

determining a first channel estimation value;

receiving a first symbol group of a long frame according to the first channel estimation value, and determining a second channel estimation value according to the first symbol group, where the long frame includes at least two symbol groups, and the symbol group includes at least one data symbol; and if a difference between the first channel estimation value and the second channel estimation value is less than or equal to a first threshold, determining a third channel estimation value according to the first channel estimation value and the second channel estimation value.

With reference to the second aspect, in a first possible implementation manner of the second aspect, before determining the first channel estimation value, the method further includes:

obtaining a data packet header of the long frame, where determining, by the channel estimation apparatus, the first channel estimation value includes:

determining the first channel estimation value according to the data packet header.

With reference to the second aspect, in a second possible implementation manner of the second aspect, determining the third channel estimation value according to the first channel estimation value and the second channel estimation value includes:

determining the third channel estimation value according to a first formula, where the first formula is H3=a*H1+(1−a)*H2, where "H1" is the first channel estimation value, "H2" is the second channel estimation value, "H3" is the third channel estimation value, and "a" is a weight of the first channel estimation.

With reference to the second possible implementation manner of the second aspect, in a third possible implementation manner of the second aspect, before determining the third channel estimation value according to the first formula, the method further includes:

determining the weight according to a second formula, where the second formula is a=(s+1)/(s+2), where "s" is a data symbol sequence number, in the long frame, of the last data symbol in the first symbol group.

With reference to the second aspect, in a fourth possible implementation manner of the second aspect, before determining the second channel estimation value according to the first symbol group, the method further includes:

obtaining a check code corresponding to the first symbol group, and checking the first symbol group according to the check code.

With reference to the fourth possible implementation manner of the second aspect, in a fifth possible implementation manner of the second aspect, obtaining the check code corresponding to the first symbol group includes:

obtaining, by using a phase shift, the check code corresponding to the first symbol group.

According to a third aspect, a channel estimation apparatus is provided, including a processor and a memory, where the memory stores computer executable instructions, and the processor is connected to the memory using a communications bus; and when the channel estimation apparatus runs, the processor executes the computer executable instructions stored by the memory, so that the channel estimation apparatus executes the method according to the foregoing second aspect.

According to the foregoing aspects, a channel estimation apparatus determines a first channel estimation value; receives a first symbol group of a long frame according to the first channel estimation value, and determines a second channel estimation value according to the first symbol group; and if a difference between the first channel estimation value and the second channel estimation value is less than or equal to a first threshold, determines a third channel estimation value according to the first channel estimation value and the second channel estimation value. In this way, the channel estimation apparatus can obtain a new channel estimation value (the second channel estimation value) according to a received symbol group, and correct an original channel estimation value (the first channel estimation value) according to the new channel estimation value, so as to accurately determine a transmission status of a data channel according to a corrected channel estimation value (the third channel estimation value).

BRIEF DESCRIPTION OF DRAWINGS

To describe the technical solutions in the embodiments disclosed herein more clearly, the following briefly describes the accompanying drawings used for describing the embodiments. The accompanying drawings in the following description show merely some aspects of the embodiments disclosed herein, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
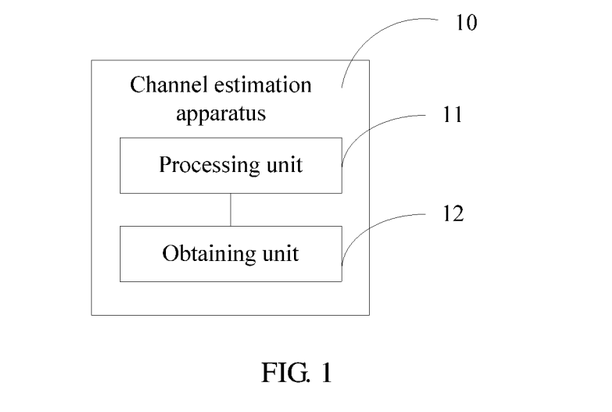
FIG. 1 is a schematic structural diagram of a channel estimation apparatus for illustrating an embodiment of the present disclosure.

An embodiment of the present disclosure provides a channel estimation apparatus 10. As shown in FIG. 1, the channel estimation apparatus 10 may be included in a receive end device in an OFDM (orthogonal frequency division multiplexing technology)-based wireless system, and the channel estimation apparatus 10 includes:

a processing unit 11, configured to determine a first channel estimation value; and an obtaining unit 12, configured to receive a first symbol group of a long frame according to the first channel estimation value obtained by the processing unit.

The long frame includes at least two symbol groups, and the symbol group includes at least one data symbol.

The processing unit 11 is further configured to: determine a second channel estimation value according to the first symbol group obtained by the obtaining unit; and if a difference between the first channel estimation value and the second channel estimation value is less than or equal to a first threshold, determine a third channel estimation value according to the first channel estimation value and the second channel estimation value.

Specifically, the long frame is obtained by aggregating multiple frames. A transmit end in the OFDM-based wireless system may divide the long frame into multiple symbol groups. Each symbol group includes a preset quantity of data symbols. The channel estimation apparatus continuously updates a channel estimation value according to a received symbol group, and a receive end determines a channel status according to an updated channel estimation value, and receives a next symbol group.

Optionally, the obtaining unit 12 is further configured to obtain a data packet header of the long frame before the first channel estimation value is determined.

The processing unit 11 is specifically configured to determine the first channel estimation value according to the data packet header obtained by the obtaining unit.

Exemplarily, the channel estimation apparatus obtains an initial channel estimation value H0 (that is, the first channel estimation value) according to the data packet header after receiving the data packet header of the long frame, and starts to receive a data payload part of the long frame according to the channel estimation value H0.

Optionally, the obtaining unit 12 is further configured to obtain a check code corresponding to the first symbol group.

The processing unit 11 is further configured to check the first symbol group according to the check code obtained by the obtaining unit.

Further, the obtaining unit 12 is specifically configured to obtain, by using a phase shift, the check code corresponding to the first symbol group.

Figure 2:
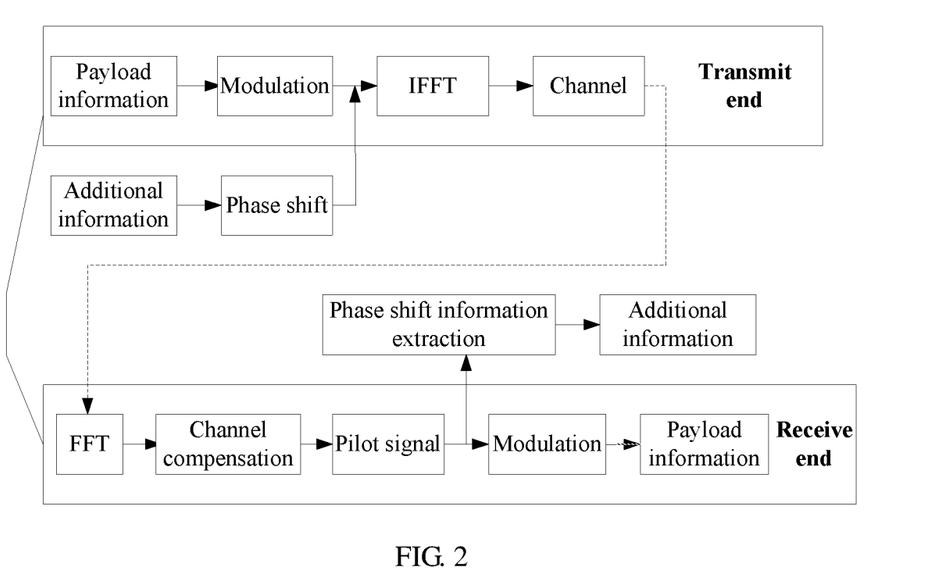
FIG. 2 is a schematic flowchart of a method of transmitting, by an OFDM-based wireless system, information by using a phase shift for illustrating an embodiment of the present disclosure.

It should be noted that, as shown in FIG. 2, a transmit end in an OFDM-based wireless system transmits information by adding different phase shifts to each OFDM symbol in the long frame. The receive end includes the channel estimation apparatus, and the channel estimation apparatus detects a phase shift corresponding to each symbol, so that the channel estimation apparatus obtains, according to the phase shift, the check code corresponding to the first symbol group.

Specifically, the check code may be a CRC (cyclic redundancy check) check code. The channel estimation apparatus checks the first symbol group according to the CRC check code, and determines a corresponding second channel estimation value according to the first symbol group after determining that CRC check on the first symbol group succeeds, or does not perform channel estimation when failing to check the first symbol group according to the CRC check code.

Optionally, the processing unit 11 is specifically configured to determine the third channel estimation value according to the first channel estimation value and the second channel estimation value by using a first formula, where the first formula is $H3=a*H1+(1-a)*H2$, where "H1" is the first channel estimation value, "H2" is the second channel estimation value, "H3" is the third channel estimation value, and "a" is a weight of the first channel estimation.

Further, the processing unit 11 is further configured to determine the weight according to a second formula before determining the third channel estimation value according to the first formula, where second formula is $a=(s+1)/(s+2)$, where "s" is a data symbol sequence number, in the long frame, of the last data symbol in the first symbol group.

Exemplarily, if the first symbol group includes the first, the second, the third, and the fourth data symbols in the long frame, a weight of a channel estimation value corresponding to the first symbol group is $a1=(4+1)/(4+2)=5/6$; and if a second symbol group includes the fifth, the sixth, the seventh, and the eighth data symbols in the long frame, a weight of a channel estimation value corresponding to the second symbol group is $a2=(8+1)/(8+2)=9/10$.

Optionally, if the difference between the first channel estimation value and the second channel estimation value is greater than the first threshold, the first channel estimation value is determined as the third channel estimation value.

Specifically, if the difference between the first channel estimation value and the second channel estimation value is less than or equal to the first threshold, the channel estimation apparatus determines that the first symbol group is decoded correctly; therefore, the first channel estimation value may be corrected according to the second channel estimation value, so as to obtain the third channel estimation value; and if the difference between the first channel estimation value and the second channel estimation value is greater than the first threshold, the first channel estimation value is not corrected by using the second channel estimation value due to an excessive value deviation and low reliability, so that the first channel estimation value is directly determined as the third channel estimation value.

Further, after determining the third channel estimation value, the channel estimation apparatus receives, according to the third channel estimation value, a second symbol group of the long frame and a check code corresponding to the second symbol group; determines a fourth channel estimation value according to the second symbol group after succeeding in checking on the second symbol group according to the check code; and when determining that a difference between the third channel estimation value and the fourth channel estimation value is less than or equal to the first threshold, determines a fifth channel estimation value according to the third channel estimation value and the fourth channel estimation value by using the first formula, by analogy, so that a channel estimation value corresponding to the data channel is updated continuously.

According to the foregoing channel estimation apparatus, the channel estimation apparatus determines a first channel estimation value; receives a first symbol group of a long frame according to the first channel estimation value, and determines a second channel estimation value according to the first symbol group; and if a difference between the first channel estimation value and the second channel estimation value is less than or equal to a first threshold, determines a third channel estimation value according to the first channel estimation value and the second channel estimation value. In this way, the channel estimation apparatus can obtain a new channel estimation value (the second channel estimation value) according to a received symbol group, and correct an original channel estimation value (the first channel estimation value) according to the new channel estimation value, so as to accurately determine a transmission status of a data channel according to a corrected channel estimation value (the third channel estimation value), so that an OFDM-based wireless system can correctly transmit an aggregate long frame according to the corrected channel estimation value.

Figure 3:
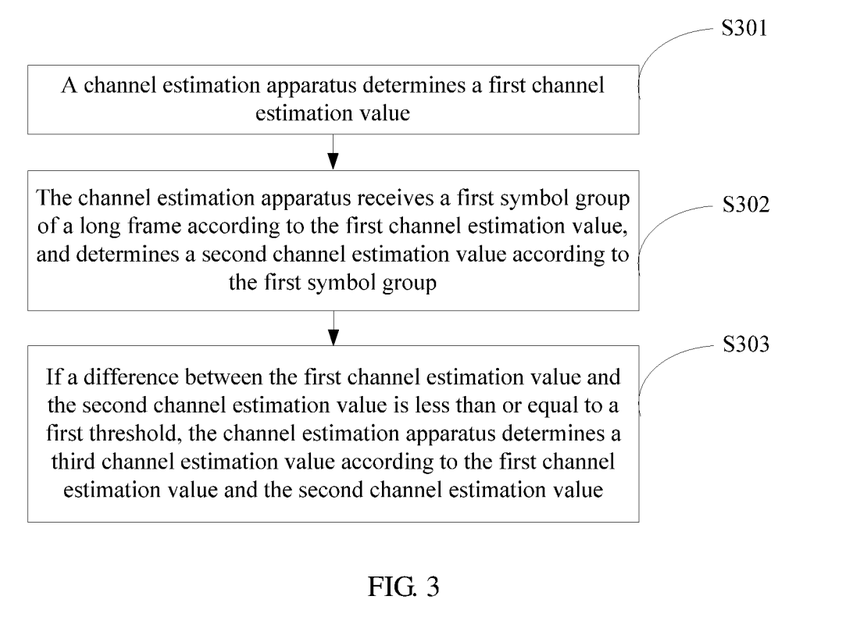
FIG. 3 is a schematic flowchart of a channel estimation method for illustrating an embodiment of the present disclosure.

An embodiment herein provides a channel estimation method. As shown in FIG. 3, the method may be executed by a channel estimation apparatus, where the apparatus may be included in a receive end device in an OFDM (orthogonal frequency division multiplexing) technology based wireless system. The method includes:

S301: The channel estimation apparatus determines a first channel estimation value.

Specifically, the channel estimation apparatus obtains a data packet header of a long frame, and determines the first channel estimation value according to the data packet header.

Exemplarily, the channel estimation apparatus obtains an initial channel estimation value H0 (that is, the first channel estimation value) according to the data packet header after receiving the data packet header of the long frame, and starts to receive a data payload part of the long frame according to the channel estimation value H0.

S302: The channel estimation apparatus receives a first symbol group of a long frame according to the first channel estimation value, and determines a second channel estimation value according to the first symbol group.

The long frame includes at least two symbol groups, and the symbol group includes at least one data symbol.

Specifically, the long frame is obtained by aggregating multiple frames. A transmit end in the OFDM-based wireless system may divide the long frame into multiple symbol groups. Each symbol group includes a preset quantity of data symbols. The channel estimation apparatus continuously updates a channel estimation value according to a received symbol group, and a receive end determines a channel status according to an updated channel estimation value, and receives a next symbol group.

Further, the channel estimation apparatus obtains a check code corresponding to the first symbol group, and checks the first symbol group according to the check code.

Still further, the channel estimation apparatus obtains, by using a phase shift, the check code corresponding to the first symbol group.

It should be noted that, as shown in FIG. 2, a transmit end in an OFDM-based wireless system transmits information by adding different phase shifts to each OFDM symbol in the long frame. The receive end includes the channel estimation apparatus, and the channel estimation apparatus detects a phase shift corresponding to each symbol, so that the channel estimation apparatus obtains, according to the phase shift, the check code corresponding to the first symbol group.

Specifically, the check code may be a CRC (cyclic redundancy check) check code. The channel estimation apparatus checks the first symbol group according to the CRC check code, and determines a corresponding second channel estimation value according to the first symbol group after determining that CRC check on the first symbol group succeeds, or does not perform channel estimation when failing to check the first symbol group according to the CRC check code.

S303: If a difference between the first channel estimation value and the second channel estimation value is less than or equal to a first threshold, the channel estimation apparatus determines a third channel estimation value according to the first channel estimation value and the second channel estimation value.

Specifically, the channel estimation apparatus determines the third channel estimation value according to a first formula, where the first formula is $H3=a*H1+(1-a)*H2$, where "H1" is the first channel estimation value, "H2" is the second channel estimation value, "H3" is the third channel estimation value, and "a" is a weight used during calculation.

Further, the channel estimation apparatus determines the weight according to a second formula before determining the third channel estimation value according to the first formula, where the second formula is $a=(s+1)/(s+2)$, where "s" is a data symbol sequence number, in the long frame, of the last data symbol in the first symbol group.

Optionally, if the difference between the first channel estimation value and the second channel estimation value is greater than the first threshold, the first channel estimation value is determined as the third channel estimation value.

Specifically, if the difference between the first channel estimation value and the second channel estimation value is less than or equal to the first threshold, the channel estimation apparatus determines that the first symbol group is decoded correctly; therefore, the first channel estimation value may be corrected according to the second channel estimation value, so as to obtain the third channel estimation value; and if the difference between the first channel estimation value and the second channel estimation value is greater than the first threshold, the first channel estimation value is not corrected by using the second channel estimation value due to an excessive value deviation and low reliability, so that the first channel estimation value is directly determined as the third channel estimation value.

Further, after determining the third channel estimation value, the channel estimation apparatus receives, according to the third channel estimation value, a second symbol group of the long frame and a check code corresponding to the second symbol group; determines a fourth channel estimation value according to the second symbol group after succeeding in checking on the second symbol group according to the check code; and when determining that a difference between the third channel estimation value and the fourth channel estimation value is less than or equal to the first threshold, determines a fifth channel estimation value according to the third channel estimation value and the fourth channel estimation value by using the first formula, by analogy, so that a channel estimation value corresponding to the data channel is updated continuously.

According to the foregoing method in which execution is performed by a channel estimation apparatus, the channel estimation apparatus determines a first channel estimation value; receives a first symbol group of a long frame according to the first channel estimation value, and determines a second channel estimation value according to the first symbol group; and if a difference between the first channel estimation value and the second channel estimation value is less than or equal to a first threshold, determines a third channel estimation value according to the first channel estimation value and the second channel estimation value. In this way, the channel estimation apparatus can obtain a new channel estimation value (the second channel estimation value) according to a received symbol group, and correct an original channel estimation value (the first channel estimation value) according to the new channel estimation value, so as to accurately determine a transmission status of a data channel according to a corrected channel estimation value (the third channel estimation value), so that an OFDM-based wireless system can correctly transmit an aggregate long frame according to the corrected channel estimation value.

Figure 4:
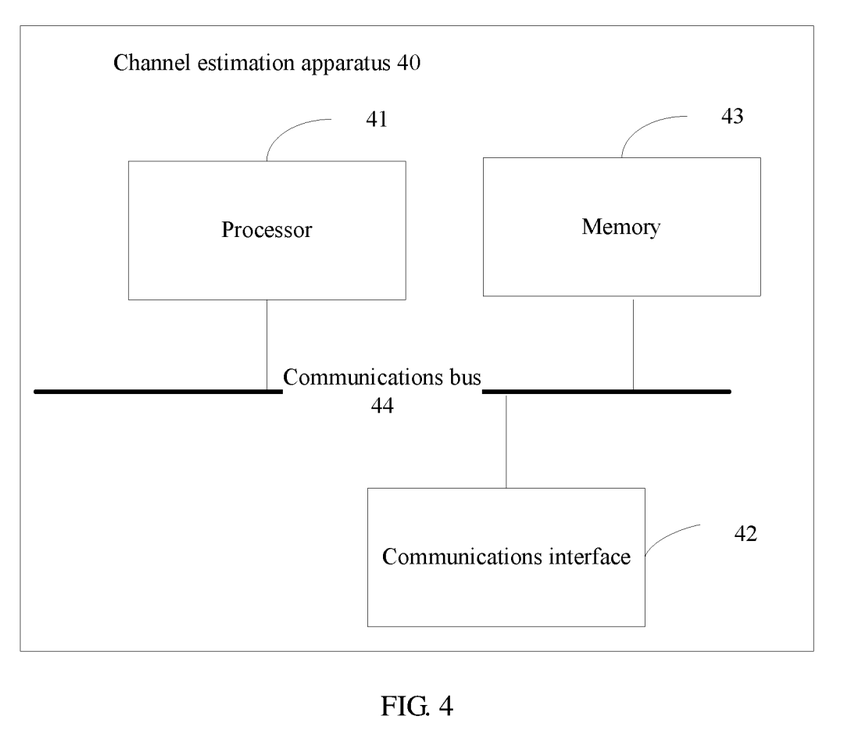
FIG. 4 is a schematic structural diagram of another channel estimation apparatus for illustrating an embodiment of the present disclosure.

An embodiment of the present disclosure provides a channel estimation apparatus 40. As shown in FIG. 4, the channel estimation apparatus 40 includes:

a processor 41, a communications interface 42, a memory 43, and a communications bus 44, where the processor 41, the communications interface 42, and the memory 43 communicate with each other by using the communications bus 44.

The processor 41 may be a central processing unit (CPU) or an application-specific integrated circuit (ASIC), or may be configured as one or more integrated circuits for implementing this embodiment.

The memory 43 is configured to store program code, where the program code includes computer operation instructions. The memory 43 may include a high-speed RAM memory, and may further include a non-volatile memory, for example, at least one magnetic disk memory.

The communications interface 42 is configured to implement connection and communication among these apparatuses.

The processor 41 executes the program code and is configured to: determine a first channel estimation value; receive a first symbol group of a long frame according to the first channel estimation value, and determine a second channel estimation value according to the first symbol group; and if a difference between the first channel estimation value and the second channel estimation value is less than or equal to a first threshold, determine a third channel estimation value according to the first channel estimation value and the second channel estimation value.

The long frame includes at least two symbol groups, and the symbol group includes at least one data symbol.

Optionally, the processor 41 is further configured to: obtain a data packet header of the long frame before determining the first channel estimation value; and determine the first channel estimation value according to the data packet header.

Optionally, the processor 41 is further configured to determine the third channel estimation value according to a first formula, where the first formula is H3=a*H1+(1−a)*H2, where "H1" is the first channel estimation value, "H2" is the second channel estimation value, "H3" is the third channel estimation value, and "a" is a weight.

Optionally, the processor 41 is further configured to determine the weight according to a second formula before determining the third channel estimation value according to the first formula, where the second formula is a=(s+1)/(s+2), where "s" is a data symbol sequence number, in the long frame, of the last data symbol in the first symbol group.

Optionally, the processor 41 is further configured to obtain a check code corresponding to the first symbol group, and check the first symbol group according to the check code.

Optionally, the processor 41 is further configured to obtain, by using a phase shift, the check code corresponding to the first symbol group.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the channel estimation apparatus described above, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely a logical function division and may be other divisions in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments herein.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments herein. The foregoing storage medium includes: any computer-readable medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the embodiments of the present disclosure, but are not intended to limit the protection and scope of the present disclosure. Any variation or replacement readily figured out by a person skilled in the art within the technical scope disclosed hereinshall fall within the protection and scope of the present disclosure. Therefore, the protection and scope of the present disclosure shall be subject to the protection and scope of the claims.

What is claimed is:

1. A channel estimation apparatus, comprising:
a processor;
a processing unit coupled to the processor, configured to cause the processor to determine a first channel estimation value; and
an obtaining unit coupled to the processor, configured to cause the processor to receive a first symbol group of a long frame according to the first channel estimation value obtained by the processing unit, wherein the long frame comprises at least two symbol groups, and each symbol group comprises at least one data symbol, wherein
the processing unit is further configured to cause the processor to:
determine a second channel estimation value according to the first symbol group obtained by the obtaining unit;
if a difference between the first channel estimation value and the second channel estimation value is less than or equal to a first threshold, determine a third channel estimation value according to the first channel estimation value and the second channel estimation value;
determine a transmission status of a data transmission channel based on the third channel estimation value so that the long frame can be correctly transmitted.

2. The apparatus according to claim 1, wherein the obtaining unit is further configured to obtain a data packet header of the long frame before the first channel estimation value is determined; and the processing unit is further configured to determine the first channel estimation value according to the data packet header obtained by the obtaining unit.

3. The apparatus according to claim 1, wherein the processing unit is further configured to determine the third channel estimation value according to a first formula, wherein the first formula is H3=a*H1+(1−a)*H2, wherein "H1" is the first channel estimation value, "H2" is the second channel estimation value, "H3" is the third channel estimation value, and "a" is a weight of the first channel estimation.

4. The apparatus according to claim 3, wherein the processing unit is further configured to determine the weight according to a second formula before determining the third channel estimation value according to the first formula, wherein the second formula is a=(s+1)/(s+2), wherein "s" is a data symbol sequence number, in the long frame, of the last data symbol in the first symbol group.

5. The apparatus according to claim 1, wherein the obtaining unit is further configured to obtain a check code corresponding to the first symbol group; and the processing unit is further configured to check the first symbol group according to the check code obtained by the obtaining unit.

6. The apparatus according to claim 5, wherein the obtaining unit is specifically configured to obtain, using a phase shift, the check code corresponding to the first symbol group.

7. A channel estimation method, comprising:

determining a first channel estimation value;

receiving a first symbol group of a long frame according to the first channel estimation value, wherein the long frame comprises at least two symbol groups and each symbol group comprises at least one data symbol;

determining a second channel estimation value according to the first symbol group;

if a difference between the first channel estimation value and the second channel estimation value is less than or equal to a first threshold, determining a third channel estimation value according to the first channel estimation value and the second channel estimation value; and determining a transmission status of a data transmission channel based on the third channel estimation value so that the long frame can be correctly transmitted.

8. The method according to claim 7, wherein before determining the first channel estimation value, the method further comprises:

obtaining a data packet header of the long frame; and wherein determining, by the channel estimation apparatus, the first channel estimation value comprises:

determining the first channel estimation value according to the data packet header.

9. The method according to claim 7, wherein determining the third channel estimation value according to the first channel estimation value and the second channel estimation value comprises:

determining the third channel estimation value according to a first formula, wherein the first formula is H3=a*H1+(1−a)*H2, wherein "H1" is the first channel estimation value, "H2" is the second channel estimation value, "H3" is the third channel estimation value, and "a" is a weight used during calculation.

10. The method according to claim 9, wherein before determining the third channel estimation value according to the first formula, the method further comprises determining the weight according to a second formula, wherein the second formula is a=(s+1)/(s+2), wherein "s" is a data symbol sequence number, in the long frame, of the last data symbol in the first symbol group.

11. The method according to claim 7, wherein before determining the second channel estimation value according to the first symbol group, the method further comprises:

obtaining a check code corresponding to the first symbol group, and checking the first symbol group according to the check code.

12. The method according to claim 11, wherein obtaining the check code corresponding to the first symbol group comprises:

obtaining, using a phase shift, the check code corresponding to the first symbol group.

13. A non-transitory machine readable medium having instructions stored therein, which when executed by a processor, cause the processor to perform operations, the operations include;

determining a first channel estimation value;

receiving a first symbol group of a long frame according to the first channel estimation value, wherein the long frame comprises at least two symbol groups, and each symbol group comprises at least one data symbol;

determining a second channel estimation value according to the first symbol group;

if a difference between the first channel estimation value and the second channel estimation value is less than or equal to a first threshold, determining a third channel estimation value according to the first channel estimation value and the second channel estimation value; and determining a transmission status of a data transmission channel based on the third channel estimation value so that the long frame can be correctly transmitted.

14. The non-transitory machine readable medium of claim 13, wherein before determining the first channel estimation value, further comprises:

obtaining a data packet header of the long frame; and determining the first channel estimation value according to the data packet header.

15. The non-transitory machine readable medium of claim 13, wherein determining the third channel estimation value according to the first channel estimation value and the second channel estimation value comprises:

determining the third channel estimation value according to a first formula, wherein the first formula is H3=a*H1+(1−a)*H2, wherein "H1" is the first channel estimation value, "H2" is the second channel estimation value, "H3" is the third channel estimation value, and "a" is a weight used during calculation.

16. The non-transitory machine readable medium of claim 15, wherein before determining the third channel estimation value according to the first formula, further comprises determining the weight according to a second formula, wherein the second formula is a=(s+1)/(s+2), wherein "s" is a data symbol sequence number, in the long frame, of the last data symbol in the first symbol group.

17. The non-transitory machine readable medium of claim 13, wherein before determining the second channel estimation value according to the first symbol group, further comprises:
 obtaining a check code corresponding to the first symbol group, and checking the first symbol group according to the check code.

18. The non-transitory machine readable medium of claim 17, wherein obtaining the check code corresponding to the first symbol group comprises:
 obtaining, using a phase shift, the check code corresponding to the first symbol group.

* * * * *